United States Patent
Wei et al.

(10) Patent No.: US 9,250,741 B2
(45) Date of Patent: Feb. 2, 2016

(54) METHOD, DEVICE AND MOBILE TERMINAL FOR THREE-DIMENSIONAL OPERATION CONTROL OF A TOUCH SCREEN

(71) Applicant: HUIZHOU TCL MOBILE COMMUNICATION CO., LTD, Huizhou, Guangdong (CN)

(72) Inventors: Jinping Wei, Guangdong (CN); Yanshun Guo, Guangdong (CN)

(73) Assignee: Huizhou TCL Mobile Communications Co., Ltd., Huizhou (CN)

( * ) Notice: Subject to any disclaimer, the term of this patent is extended or adjusted under 35 U.S.C. 154(b) by 0 days.

(21) Appl. No.: 14/403,290

(22) PCT Filed: Jul. 26, 2013

(86) PCT No.: PCT/CN2013/080176
§ 371 (c)(1),
(2) Date: Nov. 24, 2014

(87) PCT Pub. No.: WO2014/134898
PCT Pub. Date: Sep. 12, 2014

(65) Prior Publication Data
US 2015/0109242 A1    Apr. 23, 2015

(30) Foreign Application Priority Data
Mar. 4, 2013    (CN) .......................... 2013 1 0068288

(51) Int. Cl.
G06F 3/041    (2006.01)
G06F 3/044    (2006.01)
G06F 3/01    (2006.01)

(52) U.S. Cl.
CPC .............. *G06F 3/0416* (2013.01); *G06F 3/017* (2013.01); *G06F 3/044* (2013.01); *G06F 3/0412* (2013.01); *G06F 2203/04101* (2013.01); *G06F 2203/04108* (2013.01)

(58) Field of Classification Search
None
See application file for complete search history.

(56) References Cited

U.S. PATENT DOCUMENTS

2013/0181943 A1*    7/2013    Bulea ...................... G06F 3/044
345/174

FOREIGN PATENT DOCUMENTS

| CN | 101799733 A | 8/2010 |
| CN | 102081473 A | 6/2011 |
| CN | 103116432 A | 5/2013 |

* cited by examiner

*Primary Examiner* — Kenneth B Lee, Jr.
(74) *Attorney, Agent, or Firm* — Ladas & Parry ILP

(57) ABSTRACT

A method, a device and a mobile terminal for 3D operation control of a touch screen are disclosed. The method comprises the following steps: acquiring capacitance values of at least two acquiring points in a motion trajectory formed by a finger or a conductor moving in a touch screen sensing space; calculating coordinates of the acquiring points on the X-axis, the Y-axis and the Z-axis respectively according to the capacitance values of the acquiring points to obtain 3D coordinates of the acquiring points; and determining the motion trajectory according to the 3D coordinates of the at least two acquiring points and executing a corresponding operation. In this way, the purpose of identifying a 3D gesture can be achieved to enrich the operations of the mobile terminal.

13 Claims, 4 Drawing Sheets

METHOD, DEVICE AND MOBILE TERMINAL FOR THREE-DIMENSIONAL OPERATION CONTROL OF A TOUCH SCREEN

RELATED APPLICATION

This application is a national phase entry under 35 USC 371 of International Patent Application No PCT/CN2013/080176 filed on 26 Jul. 2013, which was published on 12 Sep. 2014 with International Publication Number WO 2014/134898A1, which claims priority from Chinese Patent Application No. 201310068288.1 filed on 4 Mar. 2013, the disclosures of which are incorporated in their entirety by reference herein.

FIELD OF THE INVENTION

The present disclosure relates to the technical field of communication technologies, and more particularly, to a method, a device and a mobile terminal for three-dimensional (3D) operation control of a touch screen.

BACKGROUND OF THE INVENTION

Nowadays, touch mobile terminals are being used by more and more users. Usually, operations on a touch mobile terminal are accomplished on a two-dimensional (2D) plane. In other words, manipulations of the mobile terminal and applications thereof are accomplished by touching different positions on a surface of a touch screen of the mobile terminal. However, for the conventional way of manipulating the touch screen, related operations can be achieved only when the user touches a certain position, so there is a limitation on the user's operations.

In the prior art, methods of achieving 3D operations on a touch screen of a mobile terminal are usually based on the visual sense or based on sensors. For gesture identification based on the visual sense, an image of the gesture is captured by a capturing device, and the image is analyzed and processed to identify the gesture according to gesture models already known. This kind of gesture identification is greatly affected by the environmental factors. For gesture identification based on the sensors, usually acceleration information is obtained and used to identify the gesture. However, the sensors need to be additionally provided in the mobile terminal.

SUMMARY OF THE INVENTION

A primary objective of the present disclosure is to provide a method, a device and a mobile terminal for three-dimensional (3D) operation control of a touch screen, which can identify 3D gestures, enrich operations of the mobile terminal and eliminate the need of additional sensors.

To achieve the aforesaid objective, a solution adopted by the present disclosure is as follows: a method for three-dimensional (3D) operation control of a touch screen, wherein an axis along a first direction is an X-axis, a Y-axis is perpendicular to the X-axis, and a Z-axis is perpendicular to both the X-axis and the Y-axis, the method comprising the following steps of: acquiring capacitance values of at least two acquiring points in a motion trajectory formed by a finger or a conductor moving in a touch screen sensing space, wherein a region projected by each of the acquiring points to the touch screen intersects with at least two electrodes, the capacitance values of the acquiring point are capacitance values of capacitors formed by the finger or the conductor and the at least two electrodes in the projection region respectively when the finger or the conductor approaches to the touch screen; calculating coordinates of the acquiring points on the X-axis, the Y-axis and the Z-axis respectively according to formulas $X=f(C_A, C_B)$, $$Y = \frac{\sum C_i \cdot Y_i}{\sum C_i}$$

and $$Z = \varepsilon \times \frac{A}{\sum C_{th}}$$

to obtain 3D coordinates of the acquiring points, where, $C_A$ is a capacitance value formed by a first kind of triangular electrodes in the region projected by each of the acquiring points onto the touch screen as detected by an A channel in the touch screen, $C_B$ is a capacitance value formed by a second kind of triangular electrodes in the region projected by the acquiring point onto the touch screen as detected by a B channel in the touch screen, $C_i$ is a capacitance value formed by an electrode in the region projected by the acquiring point onto the touch screen as detected by one of the channels, $Y_i$ is a position coordinate defined in the Y-axis direction by one of the electrodes in the region projected by the acquiring point onto the touch screen, each of the channels in the touch screen is connected to a corresponding electrode respectively and can detect the capacitance value formed by the corresponding electrode, the A channels refer to all channels connected with the first kind of triangular electrodes in the touch screen, the B channels refer to all channels connected with the second kind of triangular electrodes in the touch screen, A represents an area of each of the acquiring points, $\varepsilon$ represents a dielectric coefficient, $\Sigma C_{th}$ represents a capacitance change between the capacitance value of the acquiring point and an original capacitance value of the projection area, and the original capacitance value of the projection region refers to a capacitance value of the electrode in the projection region when no finger or conductor approaches to the touch screen; and determining the motion trajectory according to the 3D coordinates of the at least two acquiring points, and executing a corresponding operation.

The step of determining the motion trajectory according to the 3D coordinates of the at least two acquiring points, and executing a corresponding operation comprises: comparing magnitudes of the X-axis coordinates, the Y-axis coordinates and the Z-axis coordinates of the at least two acquiring points respectively, determining the motion trajectory according to the comparing results and executing the corresponding operation.

A maximum sensing height from a surface of the touch screen in the touch screen sensing space is 50 mm.

To achieve the aforesaid objective, a solution adopted by the present disclosure is as follows: a device for 3D operation control of a touch screen, wherein an axis along a first direction is an X-axis, a Y-axis is perpendicular to the X-axis, and a Z-axis is perpendicular to both the X-axis and the Y-axis, the device comprises a capacitance acquiring module, a calculation module and a processing module, wherein: the capacitance acquiring module is configured to acquire capacitance values of at least two acquiring points in a motion trajectory formed by a finger or a conductor moving in a touch screen sensing space and transmit the capacitance values to the calculation module, wherein a region projected by each of the acquiring points onto the touch screen intersects with at least two electrodes, the capacitance values of the acquiring point are capacitance values of capacitors formed by the finger or the conductor and the at least two electrodes in the projection region respectively when the finger or the conductor approaches to the touch screen; the calculation module is configured to calculate coordinates of the acquiring points on the X-axis, the Y-axis and the Z-axis respectively according to the capacitances of the acquiring points to obtain 3D coordinates of the acquiring points, and transmit the 3D coordinates of the acquiring points to the processing module; and the processing module is configured to determine the motion trajectory according to the 3D coordinates of the at least two acquiring points, and execute a corresponding operation.

The calculation module is further configured to calculate the coordinates of the acquiring points on the Z-axis according to the formula $$Z = \varepsilon \times \frac{A}{\Sigma C_{th}},$$

where, A represents an area of each of the acquiring points, $\in$ represents a dielectric coefficient, $\Sigma C_{th}$ represents a capacitance change between the capacitance value of the acquiring point and an original capacitance value of the projection area, and the original capacitance value of the projection region refers to a capacitance value of the electrode in the projection region when no finger or conductor approaches to the touch screen.

The calculation module is further configured to calculate coordinates of the acquiring points on the X-axis and the Y-axis respectively according to formulas $$X = f(C_A, C_B)$$

and $$Y = \frac{\sum Ci \cdot Yi}{\sum Ci},$$

where, $C_A$ is a capacitance value formed by a first kind of triangular electrodes in the region projected by each of the acquiring points onto the touch screen as detected by an A channel in the touch screen, $C_B$ is a capacitance value formed by a second kind of triangular electrodes in the region projected by the acquiring point onto the touch screen as detected by a B channel in the touch screen, Ci is a capacitance value formed by an electrode in the region projected by the acquiring point onto the touch screen as detected by one of the channels, Yi is a position coordinate defined in the Y-axis direction by one of the electrodes in the region projected by the acquiring point onto the touch screen, each of the channels in the touch screen is connected to a corresponding electrode respectively and can detect the capacitance value formed by the corresponding electrode, the A channels refer to all channels connected with the first kind of triangular electrodes in the touch screen, the B channels refer to all channels connected with the second kind of triangular electrodes in the touch screen, A represents an area of each of the acquiring points.

The processing module is further configured to compare magnitudes of the X-axis coordinates, the Y-axis coordinates and the Z-axis coordinates of the at least two acquiring points respectively, determine the motion trajectory according to the comparing results and execute the corresponding operation.

A maximum sensing height from a surface of the touch screen in the touch screen sensing space is 50 mm.

To achieve the aforesaid objective, a solution adopted by the present disclosure is as follows: a mobile terminal, comprising a device for 3D operation control and a capacitive touch screen, wherein an axis along a first direction of the capacitive touch screen is an X-axis, a Y-axis is perpendicular to the X-axis, and a Z-axis is perpendicular to both the X-axis and the Y-axis, the device for 3D operation control comprises a capacitance acquiring module, a calculation module and a processing module, wherein: the capacitance acquiring module is configured to acquire capacitance values of at least two acquiring points in a motion trajectory formed by a finger or a conductor moving in a touch screen sensing space and transmit the capacitance values to the calculation module, wherein a region projected by each of the acquiring points onto the touch screen intersects with at least two electrodes, the capacitance values of the acquiring point are capacitance values of capacitors formed by the finger or the conductor and the at least two electrodes in the projection region respectively when the finger or the conductor approaches to the touch screen; the calculation module is configured to calculate coordinates of the acquiring points on the X-axis, the Y-axis and the Z-axis respectively according to the capacitances of the acquiring points to obtain 3D coordinates of the acquiring points, and transmit the 3D coordinates of the acquiring points to the processing module; and the processing module is configured to determine the motion trajectory according to the 3D coordinates of the at least two acquiring points, and execute a corresponding operation.

The calculation module is further configured to calculate the coordinates of the acquiring points on the Z-axis according to the formula $$Z = \varepsilon \times \frac{A}{\Sigma C_{th}},$$

where, A represents an area of each of the acquiring points, $\in$ represents a dielectric coefficient, $\Sigma C_{th}$ represents a capacitance change between the capacitance value of the acquiring point and an original capacitance value of the projection area, and the original capacitance value of the projection region refers to a capacitance value of the electrode in the projection region when no finger or conductor approaches to the touch screen.

The calculation module is further configured to calculate coordinates of the acquiring points on the X-axis and the Y-axis respectively according to formulas $X=f(C_A,C_B)$ and $$Y = \frac{\sum Ci \cdot Yi}{\sum Ci},$$

where, $C_A$ is a capacitance value formed by a first kind of triangular electrodes in the region projected by each of the acquiring points onto the touch screen as detected by an A channel in the touch screen, $C_B$ is a capacitance value formed by a second kind of triangular electrodes in the region projected by the acquiring point onto the touch screen as detected by a B channel in the touch screen, Ci is a capacitance value formed by an electrode in the region projected by the acquiring point onto the touch screen as detected by one of the channels, Yi is a position coordinate defined in the Y-axis direction by one of the electrodes in the region projected by the acquiring point onto the touch screen, each of the channels in the touch screen is connected to a corresponding electrode respectively and can detect the capacitance value formed by the corresponding electrode, the A channels refer to all channels connected with the first kind of triangular electrodes in the touch screen, the B channels refer to all channels connected with the second kind of triangular electrodes in the touch screen, A represents an area of each of the acquiring points.

The processing module is further configured to compare magnitudes of the X-axis coordinates, the Y-axis coordinates and the Z-axis coordinates of the at least two acquiring points respectively, determine the motion trajectory according to the comparing results and execute the corresponding operation.

A maximum sensing height from a surface of the touch screen in the touch screen sensing space is 50 mm.

The present disclosure has the following benefits: as compared to the prior art, the present disclosure acquires capacitance values of at least two acquiring points in a gesture trajectory, calculates 3D coordinates of the at least two acquiring points of the gesture trajectory according to the capacitance values of the at least two acquiring points, and then determines the gesture trajectory to achieve the purpose of identifying the 3D gesture; and different operations can be achieved according to different gestures to enrich the operations of the mobile terminal. Meanwhile, the present disclosure determines the 3D gesture according to the capacitance values acquired from the touch screen without the need of additional sensors, so interferences from the environmental factors are also prevented.

DETAILED DESCRIPTION OF THE INVENTION

Hereinbelow, the present disclosure will be described with reference to the attached drawings and embodiments thereof.

Figure 1:
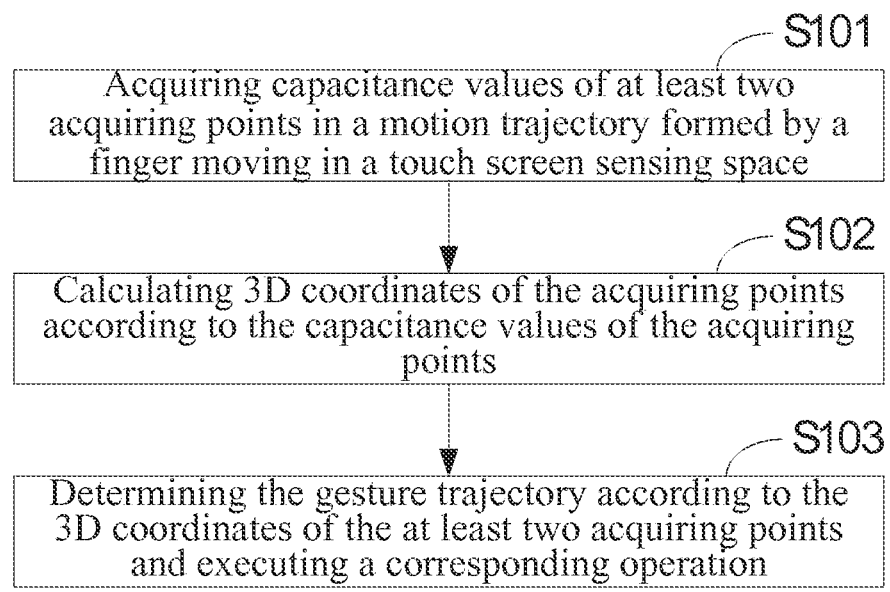
FIG. 1 is a flowchart diagram of an embodiment of a method for 3D operation control of a touch screen according to the present disclosure.

Referring to FIG. 1, there is shown a flowchart diagram of an embodiment of a method for 3D operation control of a touch screen according to the present disclosure. The method of this embodiment comprises the following steps:

Step S101: a mobile terminal acquires capacitance values of at least two acquiring points in a motion trajectory formed by a finger moving in a touch screen sensing space, wherein a region projected by each of the acquiring points onto the touch screen intersects with at least two electrodes, the capacitance values of the acquiring point are capacitance values of capacitors formed by the finger or the conductor and the at least two electrodes in the projection region respectively when the finger or a conductor approaches to the touch screen.

Figure 2:
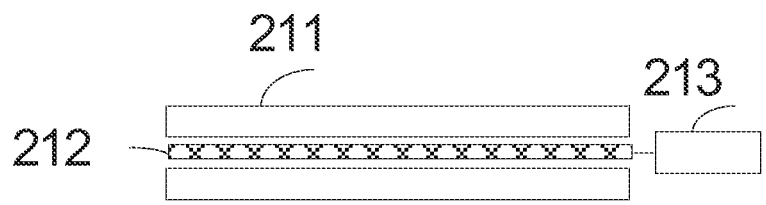
FIG. 2 is a schematic structural view of a capacitive touch screen.

For ease of description, the gesture operation is described by taking a finger as an example in all the embodiments described herein. Referring to FIG. 2, there is shown a schematic structural view of a capacitive touch screen. The capacitive touch screen in the prior art comprises a surface glass 211 and a sensing layer 212 on top of each other, and a controlling chip 213. The sensing layer 212 is comprised of a plurality of electrodes (not shown), which are electrically connected with the controlling chip 213 respectively. When no finger approaches, there are stable capacitances between the electrodes in the sensing layer 212. When the finger approaches to or touches the touch screen, coupling capacitors are generated between the finger and electrodes in a region of the touch screen that corresponds to the finger due to the electric field of the human body, and this leads to a change in the capacitances between the electrodes in the region of the touch screen that corresponds to the finger. The controlling chip 213 acquires the changed capacitance values between the electrodes to perform corresponding processing.

Figure 3:
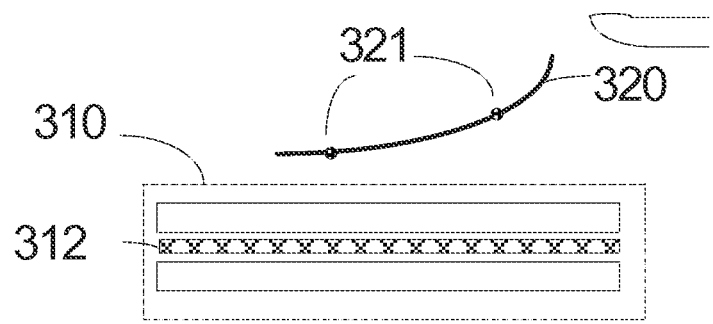
FIG. 3 is a schematic cross-sectional view illustrating a gesture operation of a finger.
Figure 4:
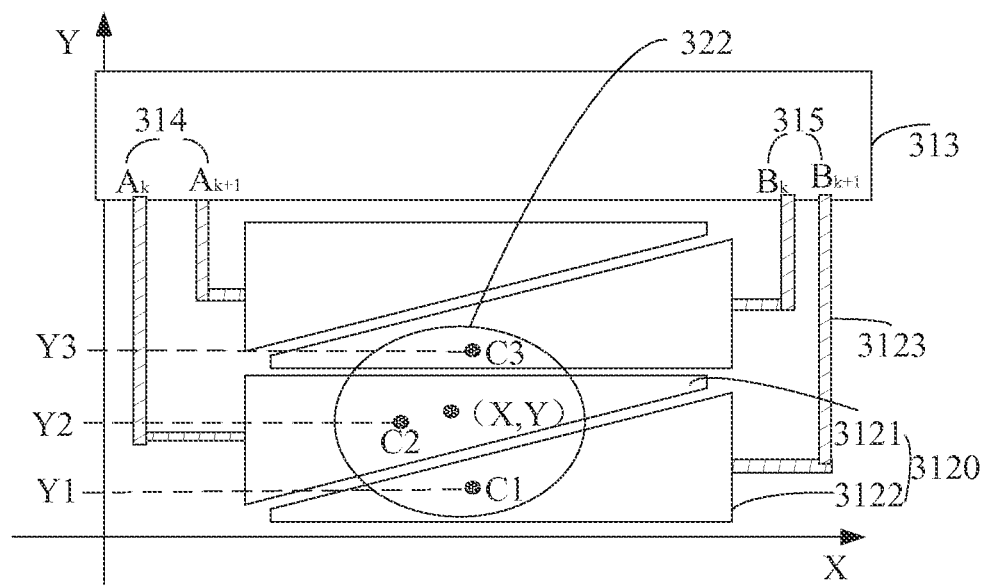
FIG. 4 is a schematic plan view illustrating a region projected by the finger onto the touch screen at a time point during the gesture operation according to an embodiment of the method for 3D operation control of a touch screen.

Referring further to FIG. 3 and FIG. 4, FIG. 3 is a schematic cross-sectional view illustrating a gesture operation of a finger, and FIG. 4 is a schematic plan view illustrating a region projected by the finger onto the touch screen at a time point during the gesture operation according to an embodiment of the method for 3D operation control of a touch screen. In the mobile terminal, a drive pulse signal is provided to monitor in real time the capacitance values of the electrodes in the sensing layer 312. During the process of making a gesture operation in the sensing space of the touch screen 310 by the finger, motion of the finger at each moment leads to a change in capacitances of the electrodes 3120 in a corresponding region of the sensing layer 312 of the touch screen 310. Once a change in capacitances of the electrodes 3120 in the sensing layer 312 is monitored by the mobile terminal, it is considered that the user is making a gesture operation and then the mobile terminal determines finger positions at at least two moments in the gesture trajectory 320 as acquiring points 321. Generally, because the finger has a certain area, a change in capacitances of capacitors of at least two electrodes 3120 in the sensing layer 312 will be caused when the finger approaches to or touches the touch screen 310 (i.e., the region 322 projected by each of the acquiring points 321 onto the touch screen 310 intersects with at least two electrodes 3120 in the sensing layer 312). The mobile terminal acquires capacitances of the capacitors formed by the electrodes 3120 in the region 322 projected by the at least two acquiring points 321 onto the touch screen 310 as capacitances of the acquiring points 321.

In this embodiment, the mobile terminal determines the acquiring points and acquires the capacitances at the acquiring points through scanning in real time. That is, when the finger is making the gesture operation, the mobile terminal determines a current position of the finger on the gesture trajectory as an acquiring point and acquires a capacitance of the electrode in the region projected by the acquiring point onto the touch screen at a preset acquiring frequency. Of course, the way for the mobile terminal to acquire the capacitances is not merely limited to scanning in real time; and in other embodiments, the mobile terminal may also acquire the capacitance values of the acquiring points at all time points when the finger makes the gesture operation and record the capacitances, and then select capacitances of at least two acquiring points according to a preset rule (e.g., capacitances of a start point and an end point), so the present disclosure has no limitation on this.

It shall be appreciated that, the sensing space of the touch screen of the mobile terminal is a region where the finger can be sensed by the touch screen. In other words, in the sensing space, the capacitance values of local electrodes in the sensing layer of the touch screen will change due to the presence of the finger. Generally, the larger the sensing space is, the higher the requirements on the power consumption, the material, the cost and the technology will be. In this embodiment, the maximum sensing height of the sensing space (i.e., the maximum vertical distance from the finger to the touch screen that can ensure a change in capacitance of the touch screen) is 50 mm. It can be understood that, the maximum sensing height of the sensing space of the present disclosure is not merely limited to 50 mm, but may be a greater value if it can be supported by the hardware technology, so the present disclosure has no limitation on this.

Furthermore, the number of the acquiring points acquired by the mobile terminal from the gesture trajectory is at least two in order to determine the gesture trajectory. The number of the acquiring points to be acquired by the mobile terminal may be preset to be a fixed value by the user or may just be a system default value. Of course, the number of the acquiring points is not limited to a fixed value, but may also be an arbitrary value greater than 2 in other embodiments so that the mobile terminal can choose to use a different number of acquiring points depending on different conditions. Further, the number of acquiring points acquired by the mobile terminal may not be at least two, and in some embodiments where operations are executed according to a position of the gesture, the mobile terminal may acquire only one acquiring point and 3D coordinates of the acquiring point are determined so that a corresponding operation is executed according to the position of the acquiring point.

Step S102: the mobile terminal calculates coordinates of the acquiring points on the X-axis, the Y-axis and the Z-axis respectively according to the capacitance values of the acquiring points to obtain 3D coordinates of the acquiring points.

Figure 5:
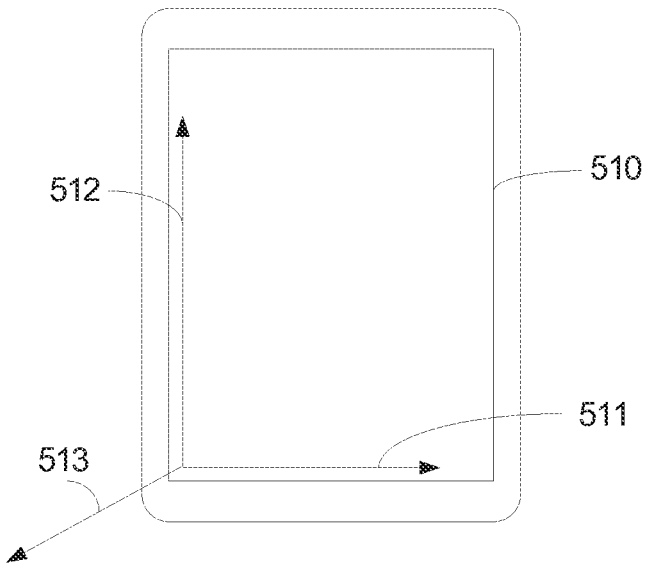
FIG. 5 is a schematic top view of a mobile terminal in an embodiment of the method for 3D operation control of a touch screen according to the present disclosure.

Firstly, the 3D coordinates in the present disclosure will be described. Referring to FIG. 5, there is shown a schematic top view of a mobile terminal in an embodiment of the method for 3D operation control of a touch screen according to the present disclosure. Let an axis along a first direction of the touch screen 510 of the mobile terminal be an X-axis 511. A Y-axis 512 is perpendicular to the X-axis 511 and cooperates with the X-axis to form a plane parallel to the touch screen 510. A Z-axis 513 is perpendicular to both the X-axis 511 and the Y-axis 512 and takes the upward direction as a positive direction. It can be appreciated that, setting of the 3D coordinates of the mobile terminal is not limited to what described above; and in practical applications, the 3D coordinates may be set depending on the practical conditions, so the present disclosure has no limitation on this.

Specifically, when the finger makes the gesture operation, each acquiring point on the gesture trajectory causes a change in capacitance values of the electrodes in the region projected onto the touch screen. The capacitance change values of the electrodes in the region projected by the acquiring point onto the touch screen are associated with a distance between the acquiring point and the touch screen. That is, the farther the distance between the acquiring point and the touch screen is, the greater the capacitance change values of the electrodes in the region projected by the acquiring point onto the touch screen will be. The mobile terminal obtains the relation of the distance between the acquiring point and the touch screen with the capacitance change values of the electrodes in the region projected by the acquiring point onto the touch screen and obtains algorithms for calculating coordinates on the X-axis and the Y-axis of the touch screen in advance, and then calculates the coordinates of the acquiring point on the X-axis, the Y-axis and the Z-axis according to the capacitance values of the acquiring point that are acquired, thus obtaining the 3D coordinates of the acquiring point.

As can be understood, depending on the electrode arrangement in the sensing layer of the touch screen, a certain relation exists between the coordinates on the X-axis and the Y-axis of the touch screen of the mobile terminal and the capacitance values of electrodes at the corresponding position. Therefore, coordinates on the X-axis and the Y-axis of each acquiring point can be obtained according to data regarding the capacitance changes in the touch screen. Of course, for different electrode arrangements in the sensing layer (e.g., for different electrode shapes), the relation between the coordinates on the X-axis and the Y-axis and the capacitance values of the electrodes at the corresponding position is different. That is, the algorithms for calculating the coordinates on the X-axis and the Y-axis of the touch screen are different, but the algorithms must be based on the capacitance values of the electrodes corresponding to these coordinates.

Step S103: the mobile terminal determines the motion trajectory according to the 3D coordinates of the at least two acquiring points, and executes a corresponding operation.

The mobile terminal sets in advance that different gesture trajectories correspond to different operations to be executed. After having acquired the 3D coordinates of the acquiring points, the mobile terminal compares magnitudes of the X-axis coordinates, the magnitudes of the Y-axis coordinates, and the magnitudes of the Z-axis coordinates of the acquiring points so as to determine the gesture trajectory according to the comparison results and to execute different operations correspondingly according to the gesture trajectory determined. If the gesture trajectory determined is not a preset gesture trajectory, then no operation will be executed by the mobile terminal. For example, the mobile terminal sets in advance that a gesture moving in a upper right direction corresponds to an operation of increasing the volume, and a gesture moving in a lower left direction corresponds to an operation of decreasing the volume.

The mobile terminal acquires the capacitance values of the two acquiring points and determines the 3D coordinates of the two acquiring points. Here, the first acquiring point is $(X1, Y1, Z1)$, the second acquiring point is $(X2, Y2, Z2)$, and the time at which the first acquiring point is acquired by the mobile terminal is earlier than the time at which the second acquiring point is acquired by the mobile terminal. The mobile terminal compares the 3D coordinates of the two acquiring points. If $X1>X2$ and $Z1>Z2$, it can be determined that the gesture trajectory is formed by the finger moving in an upper right direction, so an operation of increasing the volume is executed; and if $X1<X2$ and $Z1<Z2$, it can be determined that the gesture trajectory is formed by the finger moving in a lower left direction, so an operation of decreasing the volume is executed. In case of other comparison results than these two cases, no operation will be executed by the mobile terminal.

It shall be appreciated that, operations corresponding to different gestures may be set by the mobile terminal as system default settings, or a setting interface may be provided for the user to make such settings. Information of the settings made by the user is saved by the mobile terminal so that, after the gesture trajectory is determined, a corresponding operation can be executed according to the saved information. Additionally, the operation executed by the mobile terminal according to the gesture trajectory may be any operation that can be executed by the mobile terminal, e.g., image rotation, image scaling, volume tuning, or focus adjustment in the process of taking a picture, and the present disclosure has no limitation on this.

Figure 6:
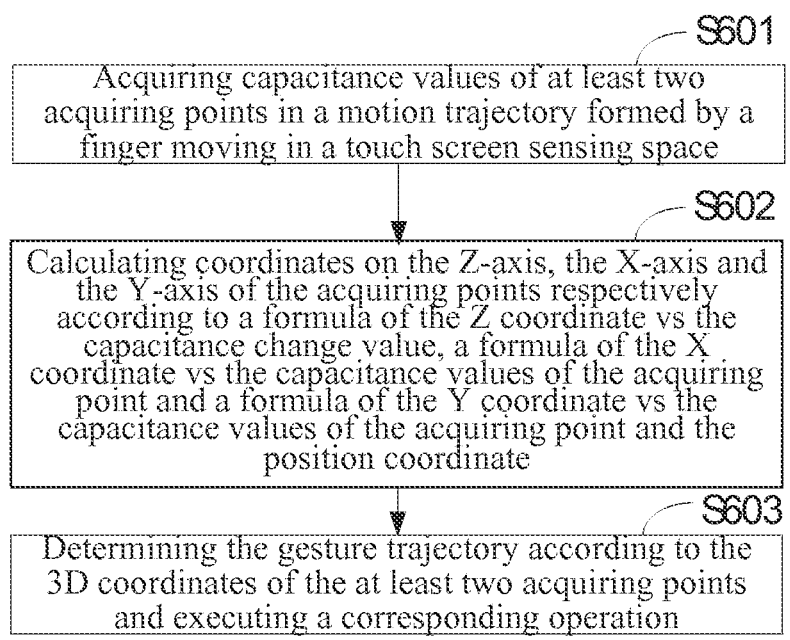
FIG. 6 is a flowchart diagram of another embodiment of the method for 3D operation control of a touch screen according to the present disclosure.

Referring to FIG. 6, there is shown a flowchart diagram of another embodiment of the method for 3D operation control of a touch screen according to the present disclosure. The method of this embodiment comprises the following steps:

Step S601: the mobile terminal acquires capacitance values of at least two acquiring points in a motion trajectory formed by a finger moving in a touch screen sensing space.

When a gesture is made by the user in the sensing space of the capacitive touch screen of the mobile terminal, a change in the capacitance value of the touch screen is detected by the mobile terminal. Then, the mobile terminal determines that this is a gesture operation made by the user, and acquires capacitance values of at least two acquiring points in the motion trajectory formed by the finger or conductor in the sensing space of the touch screen. A region projected by each of the acquiring points to the touch screen intersects with at least two electrodes, and the capacitance values of the acquiring points are capacitance values of capacitors formed by the finger or conductor and the at least two electrodes in the projection region respectively when the finger or conductor approaches to the touch screen. The sensing space of the touch screen of the mobile terminal is a region where the finger can be sensed by the touch screen. In other words, in the sensing space, the capacitance values of local electrodes of the sensing layer in the touch screen will change due to the presence of the finger.

Step S602: the mobile terminal calculates coordinates of the acquiring points on the X-axis, the Y-axis and the Z-axis respectively according to formulas $X=f(C_A,C_B)$, $$Y = \frac{\sum C_i \cdot Y_i}{\sum C_i}$$

and $$Z = \varepsilon \times \frac{A}{\sum C_{th}}.$$

Figure 7:
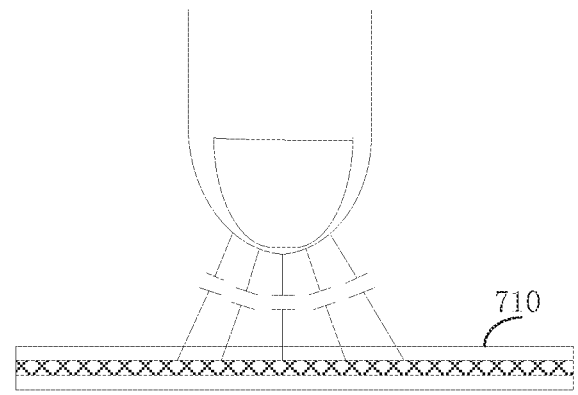
FIG. 7 is a schematic view illustrating a change in capacitance when the finger vertically touches a surface of the touch screen.

Referring to FIG. 7, because the finger has a certain area, coupling capacitors are generated between the finger and the at least two electrodes in the region projected by the finger onto the touch screen 710 when the finger approaches to the touch screen 710, and this leads to a change in capacitance values of the at least two electrodes. The change in capacitance of an electrode in the region projected by the acquiring point onto the touch screen 710 is associated with a distance between the acquiring point and the touch screen 710 and an area of the region projected by the acquiring point onto the touch screen 710. Specifically, the capacitance change Cth of the electrodes in the region projected by the acquiring points onto the touch screen 710 is reversely proportional to the distance between the finger and the touch screen 710 and is directly proportional to an area A of the finger. The mobile terminal acquires the capacitance value of the acquiring point, obtains a capacitance change value of the electrode in the region projected by the acquiring points onto the touch screen 710 according to an original capacitance value of the electrode in the region projected by the acquiring point onto the touch screen 710, and calculates coordinates of the acquiring point on the Z-aixs according to $$Z = \varepsilon \times \frac{A}{\sum C_{th}}.$$

Here, A represents an area of the acquiring point, $\in$ epresents a dielectric coefficient, $\Sigma C_{th}$ represents a capacitance change value between the capacitance value of the acquiring point and the original capacitance value of the projection area, and the original capacitance value of the projection region refers to a capacitance value of the electrode in the projection region when no finger or conductor approaches to the touch screen.

In this embodiment, the dielectric coefficient $\in$ and the finger's area A are preset. Those skilled in the art can determine the dielectric coefficient $\in$ through testing or directly according to related factors of the touch screen, and set the value of A according to the general finger size. Of course, the finger's area A may also be set by the user depending on his own conditions, or be obtained in real time by the mobile terminal through performing related transformations on the capacitance values obtained. It shall be appreciated that, because the present disclosure determines the gesture trajectory according to the 3D coordinates of the acquiring points so as to execute a corresponding operation, the Z-axis coordinates of the acquiring points need not be accurate values as long as the relation between magnitudes of the Z-axis coordinates of the different acquiring points can be ensured; and for this reason, the finger's area A need not be accurate either.

Additionally, referring to FIG. 4, because the finger has a certain area, the projection of the acquiring point on the touch screen is a region 322 having a certain area. To determine the coordinates of the acquiring point on the X-axis and the Y-axis, generally coordinates of a center point of the region 322 on the X-axis and the Y-axis are taken as the coordinates of the acquiring point on the X-axis and the Y-axis. In an embodiment, the electrodes 3120 in the sensing layer of the touch screen include a first kind of triangular electrodes 3121 and a second kind of triangular electrodes 3122. Each of the first kind of triangular electrodes 3121 is disposed opposite to one of the second kind of triangular electrodes 3122 to form a rectangular form. Each of the electrodes 3120 is connected to one end of a channel 3123, and the other end of the channel 3123 is connected to the controlling chip 313. The channel 3123 detects a capacitance value of the electrode 3120 connected therewith and outputs the capacitance value to the controlling chip 313 so that the mobile terminal can calculate coordinates of the acquiring point on the X-axis and the Y-axis according to capacitance values of capacitors formed by the electrodes in the region 322 projected by the acquiring point onto the touch screen. Here, all channels 3123 connected with the first kind of triangular electrodes 3121 are collectively called the A channel 314, and all channels 3123 connected with the second kind of triangular electrodes 3122 are collectively called the B channel 315.

In terms of the algorithm for calculating the coordinate on the X-axis of the touch screen in this embodiment, the coordinate on the X-axis of the touch screen is a ratio of a sum of capacitance values of the second kind of triangular electrodes 3122 to a sum of capacitance values of the first kind of triangular electrodes 3121 in the region 322 projected by the acquiring point onto the touch screen. The mobile terminal acquires via the corresponding channel 3123 the capacitance values of capacitors formed by the electrodes 3120 in the region 322 projected by the acquiring point onto the touch screen, and calculates the coordinate of the acquiring point on the X-axis according to $X=f(C_A,C_B)$ (i.e., the coordinate on the X-axis of the touch screen is equal to a ratio of the sum of capacitance values of the second kind of triangular electrodes 3122 to the sum of capacitance values of the first kind of triangular electrodes 3121 in the region 322 projected by the acquiring point onto the touch screen). Here, $C_A$ is a capacitance value that is formed by the first kind of triangular electrodes 3121 in the region 322 projected by the acquiring point on the touch screen as detected by the A channel 314, and $C_B$ is a capacitance value that is formed by the second kind of triangular electrodes 3122 in the region 322 projected by the acquiring point on the touch screen as detected by the B channel 314.

The coordinate on the Y-axis of the acquiring point is a weighted average of coordinates defined on the Y-axis of the electrodes 3120 in the region 322 projected by the acquiring point on the touch screen. Specifically, the mobile terminal calculates the coordinate on the Y-axis of the acquiring point from the formula $$Y = \frac{\sum Ci \cdot Yi}{\sum Ci}$$

according to the capacitance values formed by the electrodes 3120 in the region 322 projected by the acquiring point onto the touch screen and the position coordinates that the mobile terminal defines in advance for the electrodes 3120 in the touch screen. Here, Ci is a capacitance value that is formed by an electrode 3120 in the region 322 projected by the acquiring point onto the touch screen as detected by one of the channels 3123, and Yi is a position coordinate defined in the Y-axis direction by one of the electrodes 3120 in the region 322 projected by the acquiring point onto the touch screen. In this embodiment, the electrodes 3120 in the sensing layer are arranged along the Y-axis direction, and the position coordinate on the Y-axis of each electrode 3120 is a serial number of the electrode 3120 ranked in the order of positions along the positive Y direction. For example, an electrode 3120 that is the nearest to the X-axis has a position coordinate of 1, and an electrode directly above this electrode has a position coordinate of 2, and so on (the position coordinate of the electrode 3120 above is equal to the position coordinate of the electrode below plus 1).

This will be further illustrated with reference to an example. Generally, the user makes the gesture operation with a finger. The finger generally has a diameter of 15 mm, i.e., the region 322 projected by the finger onto the touch screen has a diameter of 15 mm. In this embodiment, the sensing layer of the touch screen is comprised of electrodes 3120 formed of an indium tin oxide (ITO), with each of the electrodes 3120 having a width of 5 mm in the Y-axis direction. Therefore, the region 322 projected by the finger onto the touch screen occupies three electrodes 3120. The mobile terminal acquires capacitance values C1=100 pF, C2=300 pF and C3=200 pF of the acquiring point. Meanwhile, the mobile terminal derives that the position coordinate of the electrode 3120 which has the capacitance value C1 is Y1=2, the position coordinate of the electrode 3120 which has the capacitance value C2 is Y2=3, and the position coordinate of the electrode 3120 which has the capacitance value C3 is Y3=4. In this example, there are three capacitance values C1, C2, C3 in the finger sensing region (i.e., the region 322 projected on the touch screen), so the X-coordinate of the center point of the finger sensing region 322 is a ratio of a sum of capacitance values of the second kind of triangular electrodes 3122 to a sum of capacitance values of the first kind of triangular electrodes 3121 in the region 322 projected by the acquiring point onto the touch screen, i.e. $X \approx (C1+C3)/C2=10$, and $$Y = \frac{100 \times 2 + 300 \times 3 + 200 \times 4}{100 + 200 + 300} \approx 3.17.$$

That is, the X coordinate is 10 and the Y coordinate is 3.17 for the acquiring point. Additionally, the mobile terminal acquires the dielectric coefficient $\in$ and the finger's area A that are preset, calculates the capacitance change values of the electrodes 3120 in the region 322 according to C1, C2, C3 and original capacitance values of the electrodes 3120 in the region 322 projected by the acquiring point onto the touch screen, and calculates the Z coordinate of the acquiring point according to $$Z = \varepsilon \times \frac{A}{\sum Cth}.$$

Step S603: the mobile terminal determines the gesture trajectory according to the 3D coordinates of the at least two acquiring points, and executes a corresponding operation.

The mobile terminal sets in advance that different gesture trajectories correspond to different operations. After acquiring the 3D coordinates of the acquiring points, the mobile terminal determines a gesture trajectory and executes a corresponding operation according to the gesture trajectory determined. If the gesture trajectory determined is not a preset gesture trajectory, then no operation will be executed by the mobile terminal. For example, the mobile terminal sets in advance that rightward rotation of a ball is executed when the gesture trajectory moves upwards firstly and then downwards, and leftward rotation of the ball is executed when the gesture trajectory moves downwards firstly and then upwards. In this embodiment, the mobile terminal acquires capacitance values of three acquiring points and determines the 3D coordinates of the three acquiring points. Here, the first acquiring point is (X1, Y1, Z1), the second acquiring point is (X2, Y2, Z2), and the third acquiring point is (X3, Y3, Z3). The time at which the second acquiring point is acquired by the mobile terminal is earlier than the time at which the second acquiring point is acquired by the mobile terminal but later than the time at which the first acquiring point is acquired. The mobile terminal compares the 3D coordinates of the three acquiring coordinates. If Z1>Z2 and Z2<Z3, then it is determined that the gesture trajectory moves downwards firstly and then upwards, so rightward rotation of the ball is executed; and if Z1<Z2 and Z2>Z3, then it is determined that the gesture trajectory moves upwards firstly and then downwards, so leftward rotation of the ball is executed. In case of other comparison results than these two cases, no operation will be executed by the mobile terminal.

As compared to the prior art, this embodiment of the present disclosure acquires capacitance values of at least two acquiring points in a gesture trajectory, calculates 3D coordinates of the at least two acquiring points of the gesture trajectory according to the capacitance values of the at least two acquiring points, and then determines the gesture trajectory to achieve the purpose of identifying the 3D gesture; and different operations can be achieved according to different gestures to enrich the operations of the mobile terminal.

Meanwhile, the present disclosure determines the 3D gesture according to the capacitance values acquired from the touch screen without the need of additional sensors, so interferences from the environmental factors are also prevented.

Figure 8:
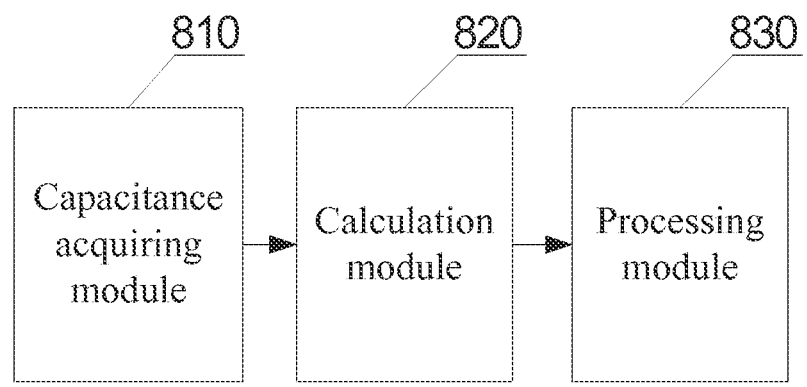
FIG. 8 is a schematic structural view of an embodiment of a device for 3D operation control of a touch screen according to the present disclosure.

Referring to FIG. 8, there is shown a schematic structural view of an embodiment of a device for 3D operation control of a touch screen according to the present disclosure. In this embodiment, the device for 3D operation control of a touch screen comprises a capacitance acquiring module 810, a calculation module 820 and a processing module 830. The calculation module 820 is coupled to the capacitance acquiring module 810 and the processing module 830 respectively. The device for 3D operation control of a touch screen is disposed in a mobile terminal comprising a capacitive touch screen.

The capacitance acquiring module 810 is configured to acquire capacitance values of at least two acquiring points in a motion trajectory formed by a finger or a conductor moving in a touch screen sensing space. A region projected by each of the acquiring points onto the touch screen intersects with at least two electrodes, and the capacitance values of the acquiring points are capacitance values of capacitors formed by the finger or the conductor and the at least two electrodes in the projection region respectively when the finger or the conductor approaches to the touch screen.

Specifically, when no finger approaches, there are stable capacitances between the electrodes in the sensing layer. When the finger approaches to or touches the touch screen, coupling capacitors are generated between the finger and electrodes in a region of the touch screen that corresponds to the finger due to the electric field of the human body, and this leads to a change in the capacitances between the electrodes in the region of the touch screen that corresponds to the finger. In the mobile terminal, a drive pulse signal is provided to monitor in real time the capacitance values of the electrodes in the sensing layer of the touch screen. During the process of making a gesture operation in the sensing space of the touch screen by the finger, motion of the finger at each moment leads to a change in capacitances of the electrodes in a corresponding region of the touch screen. Once a change in capacitances of the electrodes in the sensing layer is monitored by the mobile terminal, the capacitance acquiring module 810 considers that the user is making a gesture operation and then the determines finger positions at at least two moments in the gesture trajectory as acquiring points. Generally, because the finger has a certain area, a change in capacitances of capacitors of at least two electrodes in the sensing layer will be caused when the finger approaches to or touches the touch screen (i.e., the region projected by each of the acquiring points onto the touch screen intersects with at least two electrodes in the sensing layer). The capacitance acquiring module 810 acquires capacitances of the capacitors formed by the electrodes in the region projected by the at least two acquiring points onto the touch screen as capacitances of the acquiring points, and transmits the capacitances of the acquiring points to the calculation module 820.

In this embodiment, the capacitance acquiring module 810 determines the acquiring points and acquires the capacitances at the acquiring points through scanning in real time. That is, when the finger is making the gesture operation, the capacitance acquiring module 810 determines a current position of the finger on the gesture trajectory as an acquiring point and acquires a capacitance of the electrode in the region projected by the acquiring point onto the touch screen at a preset acquiring frequency. Of course, the way for the capacitance acquiring module 810 to acquire the capacitances is not merely limited to scanning in real time; and in other embodiments, the capacitance acquiring module 810 may also acquire the capacitance values of the acquiring points at all time points when the finger makes the gesture operation and record the capacitances, and then select capacitances of at least two acquiring points according to a preset rule (e.g., capacitances of a start point and an end point), so the present disclosure has no limitation on this.

It shall be appreciated that, the sensing space of the touch screen of the mobile terminal is a region where the finger can be sensed by the touch screen. In other words, in the sensing space, the capacitance values of local electrodes in the sensing layer of the touch screen will change due to the presence of the finger. Generally, the larger the sensing space is, the higher the requirements on the power consumption, the material, the cost and the technology will be. In this embodiment, the maximum sensing height of the sensing space (i.e., the maximum vertical distance from the finger to the touch screen that can ensure a change in capacitance of the touch screen) is 50 mm. It can be understood that, the maximum sensing height of the sensing space of the present disclosure is not merely limited to 50 mm, but may be a greater value if it can be supported by the hardware technology, so the present disclosure has no limitation on this.

Furthermore, the number of the acquiring points acquired by the capacitance acquiring module 810 from the gesture trajectory is at least two in order to determine the gesture trajectory by the device for 3D operation control of a touch screen. The number of the acquiring points to be acquired by the capacitance acquiring module 810 may be preset to be a fixed value by the user or may just be a system default value. Of course, the number of the acquiring points is not limited to a fixed value, but may also be an arbitrary value greater than 2 in other embodiments so that the capacitance acquiring module 810 can choose to use a different number of acquiring points depending on different conditions. Further, the number of acquiring points acquired by the capacitance acquiring module 810 may not be at least two, and in some embodiments where operations are executed according to a position of the gesture, the capacitance acquiring module 810 may acquire only one acquiring point and 3D coordinates of the acquiring point are determined by the device for 3D operation control of a touch screen so that a corresponding operation is executed according to the position of the acquiring point.

The calculation module 820 is configured to calculate coordinates of the acquiring points on the X-axis, the Y-axis and the Z-axis respectively according to the capacitance values of the acquiring points to obtain 3D coordinates of the acquiring points.

Firstly, the 3D coordinates in the present disclosure will be described. Referring to FIG. 5, there is shown a schematic top view of a mobile terminal in an embodiment of the method for 3D operation control of a touch screen according to the present disclosure. Let an axis along a first direction of the touch screen 510 of the mobile terminal be an X-axis 511. A Y-axis 512 is perpendicular to the X-axis 511 and cooperates with the X-axis to form a plane parallel to the touch screen 510. A Z-axis 513 is perpendicular to both the X-axis 511 and the Y-axis 512 and takes the upward direction as a positive direction. It can be appreciated that, setting of the 3D coordinates of the mobile terminal is not limited to what described above; and in practical applications, the 3D coordinates may be set depending on the practical conditions, so the present disclosure has no limitation on this.

Specifically, when the finger makes the gesture operation, each acquiring point on the gesture trajectory causes a change in capacitance values of the electrodes in the region projected onto the touch screen. The capacitance change values of the electrodes in the region projected by the acquiring point onto the touch screen are associated with a distance between the acquiring point and the touch screen. That is, the farther the distance between the acquiring point and the touch screen is, the greater the capacitance change values of the electrodes in the region projected by the acquiring point onto the touch screen will be. The calculation module 820 obtains the relation of the distance between the acquiring point and the touch screen with the capacitance change values of the electrodes in the region projected by the acquiring point onto the touch screen and obtains algorithms for calculating coordinates on the X-axis and the Y-axis of the touch screen in advance, and then calculates the coordinates of the acquiring point on the X-axis, the Y-axis and the Z-axis according to the capacitance values of the acquiring point that are acquired to obtain the 3D coordinates of the acquiring point. Then, the calculation module 820 transmits the 3D coordinates of the acquiring point to the processing module 830. As can be understood, depending on the electrode arrangement in the sensing layer of the touch screen, a certain relation exists between the coordinates on the X-axis and the Y-axis of the touch screen of the mobile terminal and the capacitance values of electrodes at the corresponding position. Therefore, coordinates on the X-axis and the Y-axis of each acquiring point can be obtained according to data regarding the capacitance changes in the touch screen. Of course, for different electrode arrangements in the sensing layer (e.g., for different electrode shapes), the relation between the coordinates on the X-axis and the Y-axis and the capacitance values of the electrodes at the corresponding position is different. That is, the algorithms for calculating the coordinates on the X-axis and the Y-axis of the touch screen are different, but the algorithms must be based on the capacitance values of the electrodes corresponding to these coordinates.

The processing module 830 is configured to determine the gesture trajectory according to the 3D coordinates of the at least two acquiring points, and executes a corresponding operation. The processing module 830 sets in advance that different gesture trajectories correspond to different operations to be executed. After having acquired the 3D coordinates of the acquiring points, the processing module 830 compares magnitudes of the X-axis coordinates, the magnitudes of the Y-axis coordinates, and the magnitudes of the Z-axis coordinates of the acquiring points so as to determine the gesture trajectory according to the comparison results and to execute different operations correspondingly according to the gesture trajectory determined. If the gesture trajectory determined is not a preset gesture trajectory, then no operation will be executed by the processing module 830.

For example, the processing module 830 sets in advance that a gesture moving in a upper right direction corresponds to an operation of increasing the volume, and a gesture moving in a lower left direction corresponds to an operation of decreasing the volume. Generally, the X coordinate is positive in the rightward direction and the Z coordinate is positive in the upward direction on the touch screen of the mobile terminal. The capacitance acquiring module 810 acquires the capacitance values of the two acquiring points and determines the 3D coordinates of the two acquiring points. Here, the first acquiring point is (X1, Y1, Z1), the second acquiring point is (X2, Y2, Z2), and the time at which the first acquiring point is acquired by the processing module 830 is earlier than the time at which the second acquiring point is acquired by the processing module 830. The processing module 830 compares the 3D coordinates of the two acquiring points. If X1>X2 and Z1>Z2, it can be determined that the gesture trajectory is formed by the finger moving in an upper right direction, so an operation of increasing the volume is executed; and if X1<X2 and Z1<Z2, it can be determined that the gesture trajectory is formed by the finger moving in a lower left direction, so an operation of decreasing the volume is executed. In case of other comparison results than these two cases, no operation will be executed by the processing module 830.

It shall be appreciated that, operations corresponding to different gestures may be set by the processing module 830 as system default settings, or a setting interface may be provided for the user to make such settings. Information of the settings made by the user is saved by the processing module 830 so that, after the gesture trajectory is determined, a corresponding operation can be executed according to the saved information. Additionally, the operation executed by the processing module 830 according to the gesture trajectory may be any operation that can be executed by the mobile terminal, e.g., image rotation, image scaling, volume tuning, or focus adjustment in the process of taking a picture, and the present disclosure has no limitation on this.

More preferably, in another embodiment of the device for 3D operation control of a touch screen that is based on the aforesaid embodiment, the calculating module further calculates coordinates of the acquiring points on the X-axis, the Y-axis and the Z-axis respectively according to formulas $X=f(C_A, C_B)$, $$Y = \frac{\sum C_i \cdot Y_i}{\sum C_i}$$

and $$Z = \varepsilon \times \frac{A}{\sum C_{th}}.$$

Specifically, because the finger has a certain area, coupling capacitors are generated between the finger and the at least two electrodes in the region projected by the finger onto the touch screen when the finger approaches to the touch screen, and this leads to a change in capacitance values of the at least two electrodes. The change in capacitance of an electrode in the region projected by the acquiring point onto the touch screen is associated with a distance between the acquiring point and the touch screen and an area of the region projected by the acquiring point onto the touch screen. Specifically, the capacitance change Cth of the electrodes in the region projected by the acquiring points onto the touch screen is reversely proportional to the distance between the finger and the touch screen and is directly proportional to an area A of the finger. The calculation module acquires the capacitance value of the acquiring point, obtains a capacitance change value of the electrode in the region projected by the acquiring point onto the touch screen according to an original capacitance value of the electrode in the region projected by the acquiring point onto the touch screen, and calculates coordinates of the acquiring point on the Z-axis according to $$Z = \varepsilon \times \frac{A}{\sum C_{th}}.$$

Here, A represents an area of the acquiring point, $\in$ represents a dielectric coefficient, $\Sigma C_{th}$ represents a capacitance change value between the capacitance value of the acquiring point and the original capacitance value of the projection area, and the original capacitance value of the projection region refers to a capacitance value of the electrode in the projection region when no finger or conductor approaches to the touch screen.

In this embodiment, the dielectric coefficient ∈ and the finger's area A are preset. Those skilled in the art can determine the dielectric coefficient ∈ through testing or directly according to related factors of the touch screen, and set the value of A according to the general finger size. Of course, the finger's area A may also be set by the user depending on his own conditions, or be obtained in real time by the mobile terminal through performing related transformations on the capacitance values obtained. It shall be appreciated that, because the present disclosure determines the gesture trajectory according to the 3D coordinates of the acquiring points so as to execute a corresponding operation, the Z-axis coordinates of the acquiring points need not be accurate values as long as the relation between magnitudes of the Z-axis coordinates of the different acquiring points can be ensured; and for this reason, the finger's area A need not be accurate either.

Additionally, referring to FIG. 4, because the finger has a certain area, the projection of the acquiring point on the touch screen is a region 322 having a certain area. To determine the coordinates of the acquiring point on the X-axis and the Y-axis, generally coordinates of a center point of the region 322 on the X-axis and the Y-axis are taken as the coordinates of the acquiring point on the X-axis and the Y-axis. In an embodiment, the electrodes 3120 in the sensing layer of the touch screen include a first kind of triangular electrodes 3121 and a second kind of triangular electrodes 3122. Each of the first kind of triangular electrodes 3121 is disposed opposite to one of the second kind of triangular electrodes 3122 to form a rectangular form. Each of the electrodes 3120 is connected to one end of a channel 3123, and the other end of the channel 3123 is connected to the controlling chip 313. The channel 3123 detects a capacitance value of the electrode 3120 connected therewith and outputs the capacitance value to the controlling chip 313 so that the calculation module can calculate coordinates of the acquiring point on the X-axis and the Y-axis according to capacitance values of capacitors formed by the electrodes 3120 in the region 322 projected by the acquiring point onto the touch screen. Here, all channels 3123 connected with the first kind of triangular electrodes 3121 are collectively called the A channel 314, and all channels 3123 connected with the second kind of triangular electrodes 3122 are collectively called the B channel 315.

In terms of the algorithm for calculating the coordinate on the X-axis of the touch screen in this embodiment, the coordinate on the X-axis of the touch screen is a ratio of a sum of capacitance values of the second kind of triangular electrodes 3122 to a sum of capacitance values of the first kind of triangular electrodes 3121 in the region 322 projected by the acquiring point onto the touch screen. The calculation module acquires via the corresponding channel 3123 the capacitance values of capacitors formed by the electrodes 3120 in the region 322 projected by the acquiring point onto the touch screen, and calculates the coordinate of the acquiring point on the X-axis according to X=f($C_A$,$C_B$) (i.e., the coordinate on the X-axis of the touch screen is equal to a ratio of the sum of capacitance values of the second kind of triangular electrodes 3122 to the sum of capacitance values of the first kind of triangular electrodes 3121 in the region 322 projected by the acquiring point onto the touch screen). Here, $C_A$ is a capacitance value that is formed by the first kind of triangular electrodes 3121 in the region 322 projected by the acquiring point on the touch screen as detected by the A channel 314, and $C_B$ is a capacitance value that is formed by the second kind of triangular electrodes 3122 in the region 322 projected by the acquiring point on the touch screen as detected by the B channel 314.

The coordinate on the Y-axis of the acquiring point is a weighted average of coordinates defined on the Y-axis of the electrodes 3120 in the region 322 projected by the acquiring point on the touch screen. Specifically, the calculation module calculates the coordinate on the Y-axis of the acquiring point from the formula $$Y = \frac{\sum Ci \cdot Yi}{\sum Ci}$$

according to the capacitance values formed by the electrodes 3120 in the region 322 projected by the acquiring point onto the touch screen and the position coordinates that the mobile terminal defines in advance for the electrodes 3120 in the touch screen. Here, Ci is a capacitance value that is formed by an electrode 3120 in the region 322 projected by the acquiring point onto the touch screen as detected by one of the channels 3123, and Yi is a position coordinate defined in the Y-axis direction by one of the electrodes 3120 in the region 322 projected by the acquiring point onto the touch screen. In this embodiment, the electrodes 3120 in the sensing layer are arranged along the Y-axis direction, and the position coordinate on the Y-axis of each electrode 3120 is a serial number of the electrode 3120 ranked in the order of positions along the positive Y direction. For example, an electrode 3120 that is the nearest to the X-axis has a position coordinate of 1, and an electrode directly above this electrode has a position coordinate of 2, and so on (the position coordinate of the electrode 3120 above is equal to the position coordinate of the electrode below plus 1).

This will be further illustrated with reference to an example. Generally, the user makes the gesture operation with a finger. The finger generally has a diameter of 15 mm, i.e., the region 322 projected by the finger onto the touch screen has a diameter of 15 mm. In this embodiment, the sensing layer of the touch screen is comprised of electrodes 3120 formed of an indium tin oxide (ITO), with each of the electrodes 3120 having a width of 5 mm in the Y-axis direction. Therefore, the region 322 projected by the finger onto the touch screen occupies three electrodes 3120. The capacitance acquiring module acquires capacitance values C1=100 pF, C2=300 pF and C3=200 pF of the acquiring point. Meanwhile, the calculation module derives that the position coordinate of the electrode 3120 which has the capacitance value C1 is Y1=2, the position coordinate of the electrode 3120 which has the capacitance value C2 is Y2=3, and the position coordinate of the electrode 3120 which has the capacitance value C3 is Y3=4. In this example, there are three capacitance values C1. C2, C3 in the finger sensing region (i.e., the region 322 projected on the touch screen), so the X-coordinate of the center point of the finger sensing region 322 is a ratio of a sum of capacitance values of the second kind of triangular electrodes 3122 to a sum of capacitance values of the first kind of triangular electrodes 3121 in the region 322 projected by the acquiring point onto the touch screen, i.e. X≈(C1+C3)/C2=10, and $$Y = \frac{100 \times 2 + 300 \times 3 + 200 \times 4}{100 + 200 + 300} \approx 3.17.$$

That is, the X coordinate is 10 and the Y coordinate is 3.17 for the acquiring point. Additionally, the calculation module acquires the dielectric coefficient ∈ and the finger's area A that are preset, calculates the capacitance change values of the electrodes 3120 in the region 322 according to C1, C2, C3 and original capacitance values of the electrodes 3120 in the region 322 projected by the acquiring point onto the touch screen, and calculates the Z coordinate of the acquiring point according to $$Z = \varepsilon \times \frac{A}{\sum C_{th}}.$$

As compared to the prior art, this embodiment of the present disclosure acquires capacitance values of at least two acquiring points in a gesture trajectory, calculates 3D coordinates of the at least two acquiring points of the gesture trajectory according to the capacitance values of the at least two acquiring points, and then determines the gesture trajectory to achieve the purpose of identifying the 3D gesture; and different operations can be achieved according to different gestures to enrich the operations of the mobile terminal. Meanwhile, the present disclosure determines the 3D gesture according to the capacitance values acquired from the touch screen without the need of additional sensors, so interferences from the environmental factors are also prevented.

The present disclosure further comprises a mobile terminal, which comprises the device for 3D operation control of a touch screen described above and a capacitive touch screen. The device for 3D operation control of a touch screen is electrically connected to the capacitive touch screen. For specific implementations thereof, reference may be made to the above description and no further description will be made herein.

It shall be appreciated that, the gesture trajectory is described to be formed by a finger in all the embodiments herein, but it shall not be construed that the gesture trajectory in the present disclosure can only be formed by a finger. Instead, the gesture trajectory in the present disclosure may be formed by any conductor, and the present disclosure has no limitation on this.

Further, it may be understood that, all the embodiments are described herein with reference to a sensing layer comprised of triangular electrodes, but it should not be construed that the present disclosure is merely limited to a sensing layer comprised of triangular electrodes. In practical implementations, the 3D operation control in the present disclosure can be accomplished on the basis of sensing layers of other structures (e.g., a sensing layer comprised of rhombic electrodes). The principle thereof is similar to that of the triangular electrodes: that is, a coordinate on the Z-axis of the acquiring point in the gesture trajectory is calculated according to the sensing capacitances in the sensing layer, and coordinates on the X-axis and Y-axis of the acquiring point in the gesture trajectory are calculated respectively according to the relation between the different positions of the sensing layer and the capacitors formed by the electrodes in the sensing layer, and then the motion trajectory of the gesture is determined according to the acquired 3D coordinates of the acquiring points to execute the corresponding operation.

Furthermore, it is apparent to those skilled in the art, the present disclosure also provides a wireless communication apparatus, which comprises a non-transitory program storage medium and a processor. The non-transitory program storage medium stores a program executed by the processor to perform the method as described in above. Furthermore, it is apparent to those skilled in the art that, various modules 810, 820, 830 as shown in FIG. 8 are software modules. In another aspect, it is well-known that various software modules inherently are stored in the non-transitory program storage medium and executed by the processor.

What described above are only the embodiments of the present disclosure, but are not intended to limit the scope of the present disclosure. Any equivalent structures or equivalent process flow modifications that are made according to the specification and the attached drawings of the present disclosure, or any direct or indirect applications of the present disclosure in other related technical fields shall all be covered within the scope of the present disclosure.

What is claimed is:

1. A method for three-dimensional (3D) operation control of a touch screen, wherein an axis along a first direction is an X-axis, a Y-axis is perpendicular to the X-axis, and a Z-axis is perpendicular to both of the X-axis and the Y-axis, the method comprising:

acquiring capacitance values of at least two acquiring points in a motion trajectory formed by a finger or a conductor moving in a touch screen sensing space, wherein a region projected by each of the acquiring points to the touch screen intersects with at least two electrodes, the capacitance values of each of the acquiring points are capacitance values of capacitors formed by the finger or the conductor and the at least two electrodes in the projection region respectively when the finger or the conductor approaches to the touch screen;

calculating coordinates of the acquiring points on the X-axis, the Y-axis and the Z-axis respectively according to formulas of $X=f(C_A, C_B)$, $$Y = \frac{\sum C_i \cdot Y_i}{\sum C_i}$$

and $$Z = \varepsilon \times \frac{A}{\sum C_{th}}.$$

to obtain 3D coordinates of the acquiring points, where, $C_A$ is a capacitance value formed by a first kind of triangular electrodes in the region projected by each of the acquiring points onto the touch screen as detected by an A channel in the touch screen, $C_B$ is a capacitance value formed by a second kind of triangular electrodes in the region projected by the acquiring point onto the touch screen as detected by a B channel in the touch screen, Ci is a capacitance value formed by an electrode in the region projected by the acquiring point onto the touch screen as detected by one of the channels, Yi is a position coordinate defined in the Y-axis direction by one of the electrodes in the region projected by the acquiring point onto the touch screen, each of the channels in the touch screen is connected to a corresponding electrode respectively and can detect the capacitance value formed by the corresponding electrode, the A channels refer to all channels connected with the first kind of triangular electrodes in the touch screen, the B channels refer to all channels connected with the second kind of triangular electrodes in the touch screen, A represents an area of each of the acquiring points, $\in$ represents a dielectric coefficient, $\Sigma C_{th}$ represents a capacitance change between the capacitance value of the acquiring point and an original capacitance value of the projection area, and the original capacitance value of the projection region refers to a capacitance value of the electrode in the projection region when no finger or conductor approaches to the touch screen; and determining the motion trajectory according to the 3D coordinates of the at least two acquiring points, and executing a corresponding operation.

2. The method of claim 1, wherein the step of determining the motion trajectory according to the 3D coordinates of the at least two acquiring points, and executing a corresponding operation comprises:

comparing magnitudes of the X-axis coordinates, the Y-axis coordinates and the Z-axis coordinates of the at least two acquiring points respectively, determining the motion trajectory according to the comparing results and executing the corresponding operation.

3. The method of claim 1, wherein a maximum sensing height from a surface of the touch screen in the touch screen sensing space is 50 mm.

4. A device for 3D operation control of a touch screen, wherein an axis along a first direction is an X-axis, a Y-axis is perpendicular to the X-axis, and a Z-axis is perpendicular to both the X-axis and the Y-axis, the device comprises a capacitance acquiring module, a calculation module and a processing module, wherein:

the capacitance acquiring module is configured to acquire capacitance values of at least two acquiring points in a motion trajectory formed by a finger or a conductor moving in a touch screen sensing space and transmit the capacitance values to the calculation module, wherein a region projected by each of the acquiring points onto the touch screen intersects with at least two electrodes, the capacitance values of the acquiring point are capacitance values of capacitors formed by the finger or the conductor and the at least two electrodes in the projection region respectively when the finger or the conductor approaches to the touch screen;

the calculation module is configured to calculate coordinates of the acquiring points on the X-axis, the Y-axis and the Z-axis respectively according to the capacitances of the acquiring points to obtain 3D coordinates of the acquiring points, and transmit the 3D coordinates of the acquiring points to the processing module; and the processing module is configured to determine the motion trajectory according to the 3D coordinates of the at least two acquiring points, and execute a corresponding operation.

5. The device of claim 4, wherein:
the calculation module is further configured to calculate the coordinates of the acquiring points on the Z-axis according to the formula $$Z = \varepsilon \times \frac{A}{\sum C_{th}},$$

where, A represents an area of each of the acquiring points, $\varepsilon$ represents a dielectric coefficient, $\Sigma C_{th}$ represents a capacitance change between the capacitance value of the acquiring point and an original capacitance value of the projection area, and the original capacitance value of the projection region refers to a capacitance value of the electrode in the projection region when no finger or conductor approaches to the touch screen.

6. The device of claim 4, wherein:
the calculation module is further configured to calculate coordinates of the acquiring points on the X-axis and the Y-axis respectively according to formulas $X=f(C_A,C_B)$ and $$Y = \frac{\sum Ci \cdot Yi}{\sum Ci}$$

where, $C_A$ is a capacitance value formed by a first kind of triangular electrodes in the region projected by each of the acquiring points onto the touch screen as detected by an A channel in the touch screen, $C_B$ is a capacitance value formed by a second kind of triangular electrodes in the region projected by the acquiring point onto the touch screen as detected by a B channel in the touch screen, Ci is a capacitance value formed by an electrode in the region projected by the acquiring point onto the touch screen as detected by one of the channels, Yi is a position coordinate defined in the Y-axis direction by one of the electrodes in the region projected by the acquiring point onto the touch screen, each of the channels in the touch screen is connected to a corresponding electrode respectively and can detect the capacitance value formed by the corresponding electrode, the A channels refer to all channels connected with the first kind of triangular electrodes in the touch screen, the B channels refer to all channels connected with the second kind of triangular electrodes in the touch screen, A represents an area of each of the acquiring points.

7. The device of claim 4, wherein the processing module is further configured to compare magnitudes of the X-axis coordinates, the Y-axis coordinates and the Z-axis coordinates of the at least two acquiring points respectively, determine the motion trajectory according to the comparing results and execute the corresponding operation.

8. The device of claim 4, wherein a maximum sensing height from a surface of the touch screen in the touch screen sensing space is 50 mm.

9. A mobile terminal, comprising a device for 3D operation control and a capacitive touch screen, wherein an axis along a first direction of the capacitive touch screen is an X-axis, a Y-axis is perpendicular to the X-axis, and a Z-axis is perpendicular to both the X-axis and the Y-axis, the device for 3D operation control comprises a capacitance acquiring module, a calculation module and a processing module, wherein:

the capacitance acquiring module is configured to acquire capacitance values of at least two acquiring points in a motion trajectory formed by a finger or a conductor moving in a touch screen sensing space and transmit the capacitance values to the calculation module, wherein a region projected by each of the acquiring points onto the touch screen intersects with at least two electrodes, the capacitance values of the acquiring point are capacitance values of capacitors formed by the finger or the conductor and the at least two electrodes in the projection region respectively when the finger or the conductor approaches to the touch screen;

the calculation module is configured to calculate coordinates of the acquiring points on the X-axis, the Y-axis and the Z-axis respectively according to the capacitances of the acquiring points to obtain 3D coordinates of the acquiring points, and transmit the 3D coordinates of the acquiring points to the processing module; and the processing module is configured to determine the motion trajectory according to the 3D coordinates of the at least two acquiring points, and execute a corresponding operation.

10. The mobile terminal of claim 9, wherein:
the calculation module is further configured to calculate the coordinates of the acquiring points on the Z-axis according to the formula $$Z = \varepsilon \times \frac{A}{\sum C_{th}},$$

where, A represents an area of each of the acquiring points, ∈ represents a dielectric coefficient, $\Sigma C_{th}$ represents a capacitance change between the capacitance value of the acquiring point and an original capacitance value of the projection area, and the original capacitance value of the projection region refers to a capacitance value of the electrode in the projection region when no finger or conductor approaches to the touch screen.

11. The mobile terminal of claim 9, wherein:
the calculation module is further configured to calculate coordinates of the acquiring points on the X-axis and the Y-axis respectively according to formulas $X=f(C_A,C_B)$ and $$Y = \frac{\sum Ci \cdot Yi}{\sum Ci},$$

where, $C_A$ is a capacitance value formed by a first kind of triangular electrodes in the region projected by each of the acquiring points onto the touch screen as detected by an A channel in the touch screen, $C_B$ is a capacitance value formed by a second kind of triangular electrodes in the region projected by the acquiring point onto the touch screen as detected by a B channel in the touch screen, Ci is a capacitance value formed by an electrode in the region projected by the acquiring point onto the touch screen as detected by one of the channels, Yi is a position coordinate defined in the Y-axis direction by one of the electrodes in the region projected by the acquiring point onto the touch screen, each of the channels in the touch screen is connected to a corresponding electrode respectively and can detect the capacitance value formed by the corresponding electrode, the A channels refer to all channels connected with the first kind of triangular electrodes in the touch screen, the B channels refer to all channels connected with the second kind of triangular electrodes in the touch screen, A represents an area of each of the acquiring points.

12. The mobile terminal of claim 9, wherein the processing module is further configured to compare magnitudes of the X-axis coordinates, the Y-axis coordinates and the Z-axis coordinates of the at least two acquiring points respectively, determine the motion trajectory according to the comparing results and execute the corresponding operation.

13. The device of claim 9, wherein a maximum sensing height from a surface of the touch screen in the touch screen sensing space is 50 mm.

* * * * *